May 17, 1927.  
F. LASZLO  
1,629,081  
ROTOR FOR DYNAMO ELECTRIC MACHINES  
Filed Dec. 2, 1925
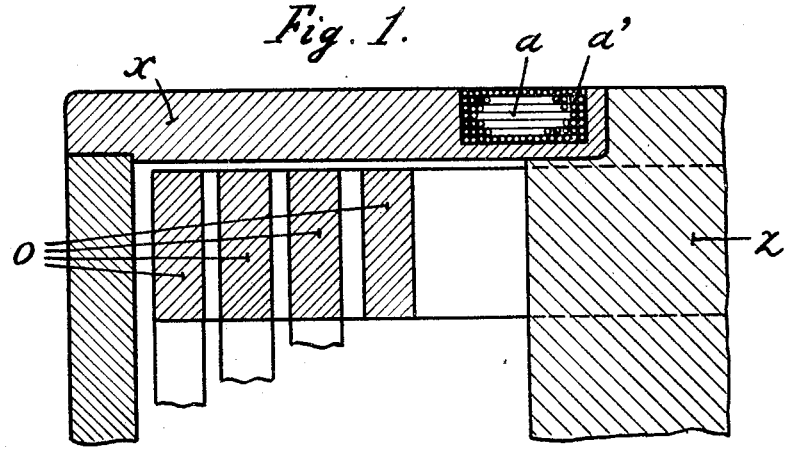
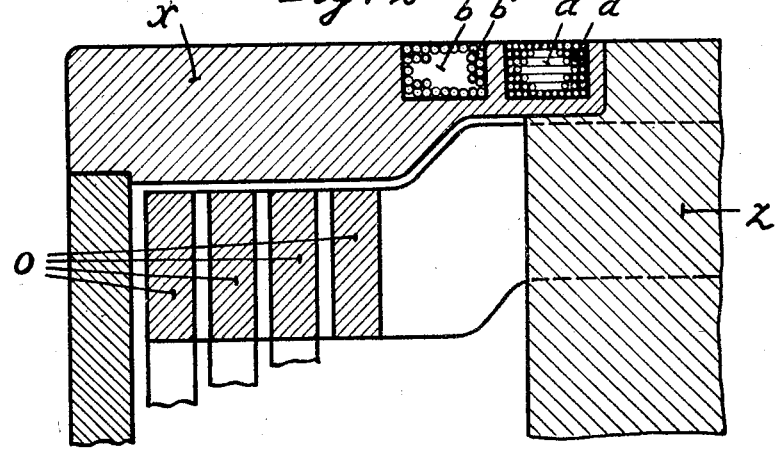

Patented May 17, 1927.

1,629,081

UNITED STATES PATENT OFFICE.

FRANZ LASZLO, OF MULHEIM-RUHR, GERMANY, ASSIGNOR TO THYSSEN & CO. AKTIENGESELLSCHAFT, OF MULHEIM-RUHR, GERMANY.

ROTOR FOR DYNAMO-ELECTRIC MACHINES.

Application filed December 2, 1925, Serial No. 72,755, and in Germany December 28, 1922.

This invention relates to improvements in a rotor for dynamo-electric machines, and more particularly to an improved fastening for the rotor coil heads projecting from the ends of the rotor core.

Various fastenings to this end are already known heretofore, which essentially comprise four different groups:

Firstly, those constructions may be mentioned, in which the projecting rotor coil heads are pressed from outside, by means of bindings wound-on under tension upon a rigid cylindrical extension of the rotor core.

Secondly, it is usual to place solid cylindrical bodies, so-called hoods, over the projecting rotor coil heads, which in this case need not be supported toward the rotor core middle, said hoods being concentrically fixed with reference to the rotor core middle.

Thirdly, another fastening combines the two first-mentioned ones by the employment, instead of solid cylindrical bodies (hoods), of comparatively thin-walled hoods upon which bindings are wound under tension.

Fourthly, it has been proposed to place solid hoods over wire bindings or tapings laid around the projecting rotor coil heads.

It is true that the constructions mentioned suit certain technical requirements, though they have nevertheless the following disadvantages:

The constructions first-mentioned require much time and high costs resulting from the removal of the old bindings and subsequent re-winding of the same in the event of even slight repairs only of the coils or coil heads, while furthermore with high-speed rotors of large dimensions the coils and bindings by action of centrifugal force yield owing to non-uniform load and gradually assume oval cross-sections.

Solid hoods allow a quick covering and uncovering of the coil heads without loss of material, while they are so strong that they do not get oval under the circumstance afore-mentioned. With high-speed rotors of large dimensions, however, the requirements of strength and magnetic qualities of the material of the hoods result in many difficulties. Certain cross-sections of the hood, particularly at the place where the latter adjoins the active rotor iron, can, for constructional reasons, be made very thin only in radial direction, while on the other hand they are frequently required to have as low a magnetizability as possible. Generally, bindings can be made of a much higher yield-point than that of the best materials of solid hoods, which are, however, of good magnetizability. Therefore, one was compelled to insert, for allowing an employment of solid strong hoods, narrow nonmagnetizable rings between the hood ends and the adjacent active rotor iron in order to avoid there a magnetic short-circuit, even in such cases where the radial thickness of the hood was reduced for constructional reasons.

The third group, namely thin-walled hoods with strong bindings thereon, has, before all, the drawback that it is too expensive, while furthermore the hoods have little strength only. Finally, their boring or inner diameter being invariable, a reliable forcing of the coil heads on a cylindrical extension of the rotor core can hardly be obtained by the same. Thus, a circular outer circumference of said fastening is not absolutely ensured.

The fourth proposal of placing a solid hood over a binding wound upon the coil heads, has the various drawbacks of the first three groups according to the ratio of strength of binding and hood. Generally, the binding presses the coil heads on a cylindrical extension of the rotor core underneath, the unavoidably different resiliency of the coil heads resulting then in the outer circumference of the binding becoming untrue. Then, the exactly cylindrical hood is placed over this more or less untrue binding. Apart from all other disadvantages, said construction requires at repairs of the coil heads a removal and re-winding of the binding.

The present invention relates to an improved particular combination of solid hoods and wound-on bindings, for fastening the laterally projecting rotor coil heads, said hoods consisting either of magnetizable or non-magnetizable material. The invention consists in providing the solid hoods at the place or places of their highest requirement of strength with rather deep ring grooves of suitable axial length, and winding in said grooves bindings of highest yield-point. Thereby, on the contrary to the hitherto known constructions, an essentially rigid hood, with some small cross-sections only without own rigidity, is produced. Said small cross-sections receive, however, their rigidity by the directly adjacent rigid full cross-sections of the hood. Besides, the arrangement may be such that the cross-section of the hood, which receives the ring grooves and which thereby might become flexible, bears tightly upon a projection of the rotor core and is thus securely protected against becoming untrue.

The invention results in a series of important advantages partly of constructional nature and partly in magnetic respects. Thus, for instance, at those places where hood material of low magnetizability and low requirements of strength is desired, cheap binding material of low magnetizability, for instance bronze, can be used; while, for attaining a rigid fastening of highest strength, a hood of strongest and well magnetizable material can be provided at its place adjoining the active rotor iron with a ring groove upon which a non-magnetizable binding of high strength is wound forming thus at said place a non-magnetizable ring thereon; any other appropriate combinations lying within the scope of the invention being besides possible.

Thus, by the insertion in the ring grooves at the inner ends of solid hoods, of binding rings of certain conditions of strength and certain magnetic or non-magnetic qualities, it is possible to impart to said hoods locally bounded particular conditions of strength or magnetizability.

The accompanying drawing illustrates, by way of example, two preferred constructional forms of the subject matter of the present invention: Fig. 1 is an axial section through a rotor end with a solid hood bearing with its inner end on the rotor core and there provided with a ring groove for the purpose specified, while Fig. 2 is a similar view to that shown in Fig. 1, with the inner end of the hood being weakened and provided with two such grooves.

At the joining place between the rotor core $z$ and the solid hood $x$ placed over the projecting rotor coil heads $o$, not only the highest stress occurs but it is also desirable that the material of the hood in proximity to said joining place is non-magnetizable.

As shown in Fig. 1, the inner end of the hood $x$ is provided with a rather deep ring groove $a$ of suitable axial length, in which a binding $a'$ of highest yield-point and at the same time of low magnetizability is wound.

As shown in Fig. 2, the inner end of the hood is weakened for certain constructional reasons, in which case, beside the groove $a$ with non-magnetic binding $a'$ of high yield-point thereon, another groove $b$ is provided, which, for instance, receives an additional magnetic binding $b'$ that has also particularly favourable conditions of strength. Thereby, with a simultaneous influence upon the magnetic flux, the required strength of the hood against its being strained by centrifugal forces is obtained.

Even if the magnitude of the stress at the places where non-magnetizable material is desired, would admit the employment of solid non-magnetizable insertion-rings aforementioned as known in the art, hoods provided with the ring grooves mentioned and upon which non-magnetizable bindings are wound are still to be preferred by reason of their lower costs of manufacture as well as of their more favourable conditions of strength.

What I claim, is:

1. The combination, in a rotor for dynamo-electric machines, of a rotor core, rotor coil heads projecting from the ends of the latter, a solid fastening-hood placed over said coil heads with its inner end upon said rotor core and having at said inner end at least one deep ring groove, and bindings of a high yield-point wound in said ring groove, substantially as set forth.

2. The combination, in a rotor for dynamo-electric machines, of a rotor core, rotor coil heads projecting from the ends of the latter, a solid fastening-hood of magnetizable material placed over said coil heads with its inner end upon said rotor core and having at said inner end at least one deep ring groove, and non-magnetizable bindings of a high yield-point wound in said ring groove, substantially as set forth.

In testimony whereof I have hereunto set my hand.

FRANZ LASZLO.